Figure 1:
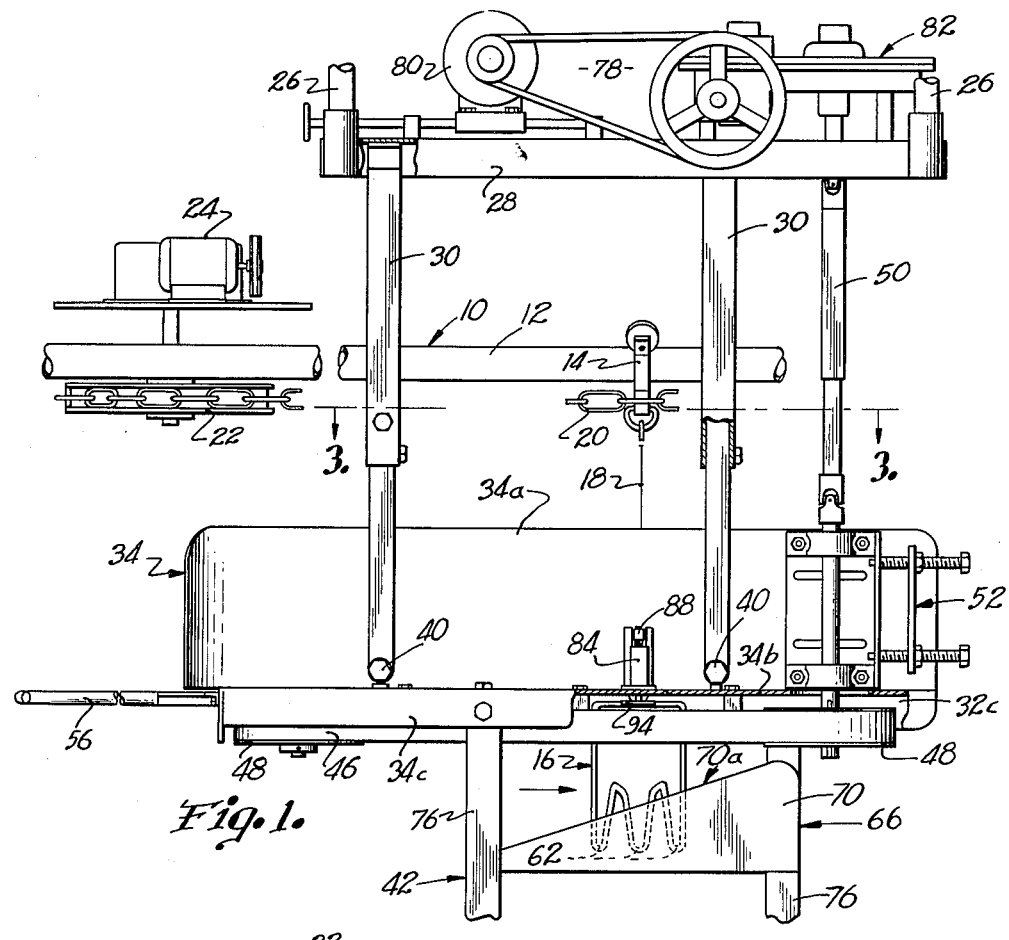

Sept. 17, 1963

R. S. ZEBARTH ET AL 3,103,694

APPARATUS FOR AUTOMATICALLY SEPARATING
POULTRY FROM SHACKLES

Filed Feb. 1, 1960

2 Sheets-Sheet 1

INVENTORS.
Ralph S. Zebarth
BY Robert D. Crawford

Horey, Schmidt, Johnson & Hovey
ATTORNEYS

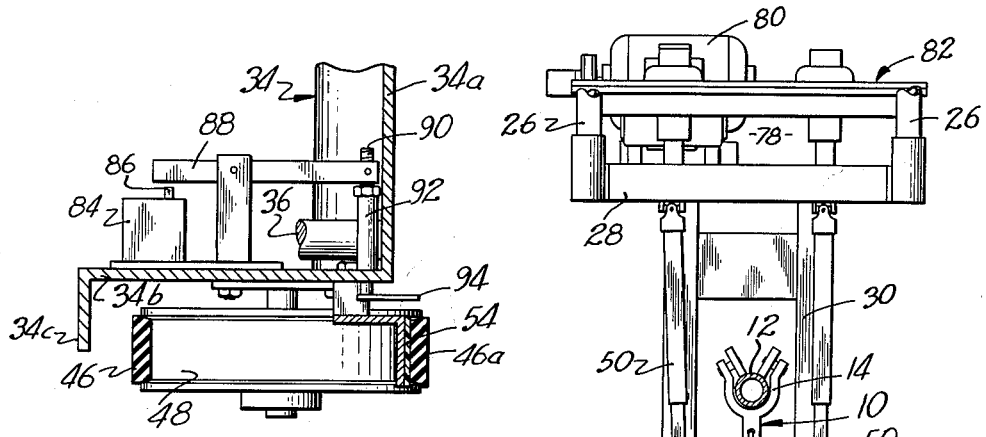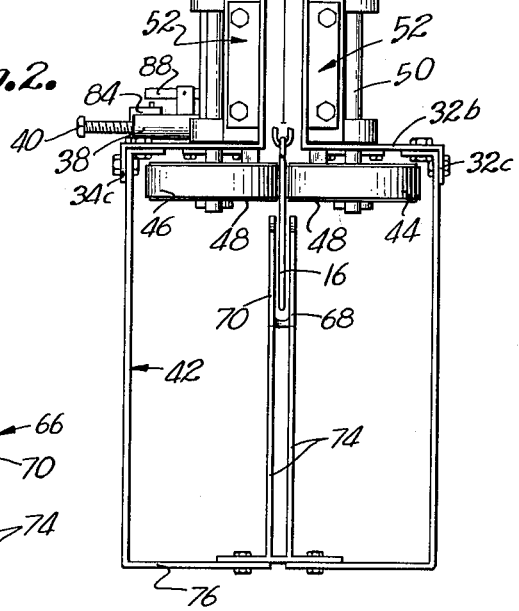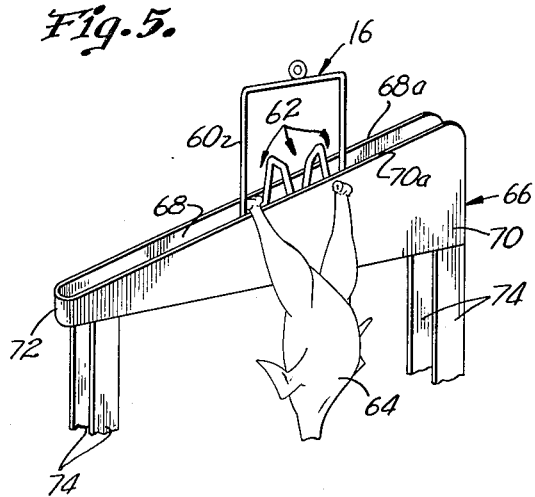

United States Patent Office 3,103,694
Patented Sept. 17, 1963

3,103,694
APPARATUS FOR AUTOMATICALLY SEPARATING POULTRY FROM SHACKLES
Ralph S. Zebarth, Kansas City, and Robert D. Crawford, Parkville, Mo., assignors to Gordon Johnson Company, Kansas City, Mo., a corporation of Missouri
Filed Feb. 1, 1960, Ser. No. 5,812
16 Claims. (Cl. 17—11)

This invention relates to an automatic bird take-off machine for use in poultry processing plants wherein, during the many operations for preparing poultry for market, including scalding, feather removal, evisceration and a multitude of additional steps, the birds are individually suspended from a shackle.

The fowl is supported by holding portions of the shackle either by the neck, the feet, the hock, or the wing and heretofore it has been necessary to manually remove the birds, as for example, when they are to be deposited in a chiller and no longer to be restrained by the shackle during the chilling operation. This manual removal of the birds from the shackles is, of course, time consuming and an added expense; hence, it is the prime object of the instant invention to render the bird removal operation completely automatic.

It is the most important object of the present invention to include in a machine of the aforementioned character, structure that will positively hold the shackle in proper position for bird removal since normally, such shackle is rather loosely suspended from an overhead conveyor and by virtue of such normal free movement, it is difficult to apply the necessary force for release of the bird unless the swinging and twisting movement in the shackle is completely removed.

Another important object of the present invention is to provide in the shackle-holding mechanism, a gripping action on the shackle such as to prevent its upward movement inasmuch as the action imparted to the bird is in the form of an upward lifting force to raise the bird sufficiently to clear the bird-holding portions of the shackles.

Still another object of the instant invention is to provide apparatus for automatically removing poultry from shackles that is continuous in its operation, thereby permitting the overhead conveyor from which the shackles, and therefore the birds, are suspended to be advanced without interruption throughout the time that the train of shackles is cleared of birds.

Still another important object of the present invention is to provide bird-lifting means within the machine for deflecting the same upwardly and out of the shackle, and which is operable irrespective of the manner in which the fowl is suspended from the shackle, and also irrespective of which side of the shackle the body of the bird projects as each unit passes through the bird take-off machine.

Another object of the instant invention is to remove all necessity of operator attention by virtue further of the fact that there is included an automatic shut-down control in the event that either the overhead conveyor or the shackle holding and guiding belts of the machine of the instant invention cease operating or the relative speeds of the belts and the overhead conveyor change at any time.

Figure 3:
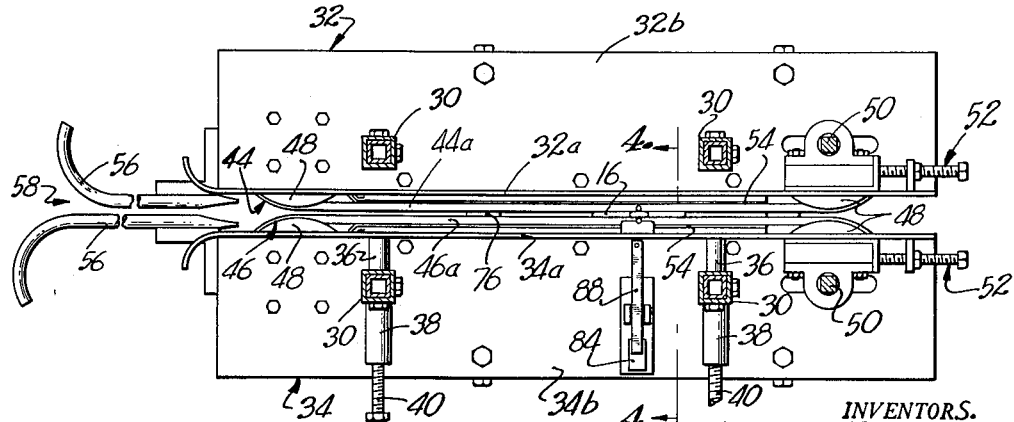

In the drawings:
FIG. 1 is a fragmentary, side elevational view of apparatus for automatically separating poultry from shackles made pursuant to our present invention.
FIG. 2 is a view showing the outlet end thereof.
FIG. 3 is a cross-sectional view taken on line 3—3 of FIG. 1.

FIG. 4 is an enlarged, fragmentary, detailed, cross-sectional view taken on line 4—4 of FIG. 3; and
FIG. 5 is a fragmentary, perspective view of the deflector or lifter of the machine and illustrating its manner of operation in removing a bird from a shackle.

It is quite common in poultry processing plants to provide an overhead conveyor 10 that includes a track 12 which supports a train of wheeled carriages 14 from each of which is suspended a shackle 16, as for example, through use of a chain 18. The carriages 14 may be interconnected by a chain 20 and may be driven by a power wheel 22 operably coupled with a prime mover such as an electric motor 24.

The machine about to be described and forming the subject matter of the instant invention, has been designed for use in conjunction with the conveyor 10 and, therefore, as best seen in FIG. 2 of the drawings, it is disposed in straddling relationship to the track 10. A suggested support for the machine is in the nature of a plurality of suspension members 26 connected with a platform 28 from which depends a plurality of extensible hangers 30.

A pair of spaced, Z-shaped members 32 and 34 are carried by the hangers 30 at the lowermost ends thereof, members 32 and 34 including upright plates 32a and 34a, horizontal plates 32b and 34b integral with and extending laterally outwardly from plates 32a and 34a, and down-turned flanges 32c and 34c integral with the outermost, longitudinal edges of plates 32b and 34b. Plate 32b may be welded or otherwise affixed directly to the lowermost ends of its corresponding hangers 30 but, the member 34 is suspended from its hangers 30 through use of outwardly projecting rods 36 welded or otherwise affixed to plate 34a, immediately above plate 34b. Rods 36 are in turn slidable within tubes 38 rigid to the lower ends of corresponding hangers 30 and an adjusting bolt 40 extends through the outermost free end of the tube 38 in abutting relationship to the inner end of the corresponding rod 36. Hence, through use of the bolts 40, the member 34 may be shifted toward the member 32 to decrease the space between the plates 32a and 34a.

It may be pointed out at this juncture that frame 42 (hereinafter more fully described), depending from the members 32 and 34, is sufficiently resilient to permit the adjustment just above set forth.

A pair of continuous belts 44 and 46 are carried beneath plates 32b and 34b respectively, by pulleys 48, two of which are driven by extensible shafts 50 having a number of universal joints therein as seen in FIGS. 1 and 2 to permit the adjustment between plates 32a and 34a as above described, and to permit operation of belt tightener assemblies 52 carried by plates 32a and 34a.

Belts 44 and 46 are so disposed that their innermost horizontal stretches 44a and 46a are in close juxtaposition. Note that plates 32b and 34b carry backing plates 54 for the stretches 44a and 46a and that the space, if any, between the stretches 44a and 46a is in direct vertical alignment with the track 12 therebelow so that as the shackles 16 successively move through the machine between the stretches 44a and 46a, the chains 18 hang vertically from the carriages 14.

Members 32 and 34 have elongated guides 56 mounted thereon and bent at their outermost free ends to present an entrance mouth 58 for the shackles 16, the purpose whereof is to quiet the shackles 16 and remove all swinging and twisting thereof before the shackles 16 enter between the plates 32a and 34a and, therefore, between the belt stretches 44a and 46a in the manner and in the position illustrated for the shackles 16 in FIGS. 1 and 2 of the drawings.

The shackle 16 chosen for illustration is in the nature of a wire or rod frame 60 having bird-holding portions at the lower extremities thereof and shown to be in the nature of a plurality of upwardly facing notches 62, the centermost of which is normally used to permit suspension of bird 64 by its neck prior to removing its head. The two outermost notches 62 of the shackle 16 are, on the other hand, adapted to receive either the wings or the legs of the bird 64, and if the feet have been removed, the suspension is from the knee joint as is evident from FIG. 5. However, insofar as the instant invention is concerned, it matters not how the bird 64 is suspended from the shackle 16 and the operation of the machine is even effective when but one of the notches 62 is used to hang the bird 64 from one of its wings or one of its legs.

The lifter or deflector which raises the bird 64 high enough to cause it to become released from the shackle 60, is best illustrated in FIG. 5 of the drawings and is broadly designated by the numeral 66. It consists of a pair of spaced, elongated, substantially triangular plates 68 and 70 that are in parallelism with their transverse axes vertically disposed and which may be joined integrally by an arcuate bight 72.

The deflector or lifter 66 is supported immediately below the belts 44 and 46 by a number of legs 74 that are in turn supported by a pair of U-shaped brackets 76 constituting the frame 42, and it is between the plates 68 and 70 that the lower extremities of the shackle 16 below belts 44 and 46 pass during advancement of the shackles 16 from the mouth 58 to the outlet end of the members 32 and 34. Plates 68 and 70 are provided with longitudinal, inclined edges 68a and 70a that serve as ramps and that slope downwardly as the mouth 58 is approached. Inasmuch as the edges 68a and 70a progressively increase in height in the direction of travel of the birds 64 and the shackles 16, it is apparent in FIG. 5 of the drawings that the birds 64 are raised out of the notches 62 sufficiently to release the birds 64 and permit them to gravitate from the deflector 66 as the shackles 16 continue to advance by the joint operation of conveyor 10 and the belts 44 and 46 which grip the upper extremities of the frame 60 between stretches 44a and 46a.

The shafts 50 and, therefore, the belts 44 and 46, are driven by power means 78 carried by platform 28 and including a primer mover such as an electric motor 80. A suitable reduction gearing unit or assembly broadly designated by the numeral 82 is interposed between the motor 80 and the two driven shafts 50.

It is now manifest that the two prime movers 24 and 80 must be synchronized so that the carriages 14 are advanced along the track 12 at the same rate of speed as the shackles 16, squeezed between the stretches 44a and 46a, are motivated by the continuously operating belts 44 and 46. If this relationship between the speeds of travel of the carriages 14 and the shackles 16 is interrupted, difficulties are obviously experienced to the point of breakage of, or damage to the components of the conveyor 10, or the bird-removing machine of the instant invention.

Consequently, there is provided a safety control that includes an electric switch 84 carried by the plate 34b and best illustrated in FIG. 4. Spring-loaded control button 86 is disposed in alignment with and below one end of a swingable lever 88 that is likewise carried by the plate 34b. The opposite or innermost end of the lever 88 is pivotally connected to a vertically reciprocable rod 90 adjacent the outer face of the plate 34a. Rod 90 is guided within a tube 92 fixed to plate 34b and extending upwardly therefrom. Rod 90 extends downwardly through the plate 34b and has a laterally extending actuator 94 affixed to the lowermost end thereof and directly overlying the innermost stretch 46a of belt 46.

The switch 84 is operably coupled with the prime mover 24 and/or the prime mover 80 such that downward actuation of the button 86 of switch 84, de-energizes either or both of the prime movers 24 and 80. The circuitry between switch 84 and the prime movers 24 and 80 may be quite conventional and is, therefore, obviously not illustrated. Any upward deflection of the inner stretch 46a, out of its normal horizontal disposition, sufficient to cause the stretch 46a to engage the actuator 94 and raise the rod 90, swings the lever 88 so that the latter in turn actuates the control button 86 for switch 84.

If, therefore, for example, the motor 80 stops, the tendency for carriages 14 to continue to move along track 12 under the power of motor 24, will result in an upward component on shackles 16 between the belts 44 and 46. As such shackles 16 move upwardly while being gripped between stretches 44a and 46a, the stretch 46a will deflect sufficiently to raise the actuator 94, and, of course, this de-energizes motor 24 before damage can occur. If the switch 84 is also operably coupled with the motor 80, it can be de-energized in the same manner if, for some reason or other, the carriages 14 do not continue to advance. In this instance, the tendency of the belts 44 and 46 to advance the shackles 16 while carriages 14 are stationary, or moving too slowly, will likewise deflect the stretch 46a sufficiently to open switch 84 and de-energize motor 80.

It is important to note that edges 68a and 70a are equally capable of removing the birds from the holding portions of the shackles, depending upon the position of the shackles and birds as they enter the mouth 58. In the one instance, as shown in FIG. 5, the bird 64 hangs from one side of the shackle and plate 70 becomes a divider between bird 64 and the lower extremities of the shackle 16. If, on the other hand, the shackle 16 is turned oppositely at the time it enters the mouth 58, the bird 64 will slide along the outer face of the plate 68, whereupon the edge 68a becomes the primary factor in raising the bird 64 out of the notches 62 during the time that the bird 64 slides upwardly along the edge 68a. In any event, the two edges 68a and 70a often-times cooperate in raising the bird 64 if parts thereof extend through the shackle 16 sufficiently to engage both of the edges 68a and 70a.

Suspension as a means of supporting the machine in proper relationship to the conveyor 10, is illustrated to show how it is possible to rapidly and continually drop the birds 64 into any suitable receiver beneath the framework 42. Hence, by way of example, the birds 64 may be discharged directly into a chilling tank and such successive step in the over-all operation, commenced immediately, all without operator attention insofar as transferring the birds from the conveyor 10 to the chiller is concerned.

Having thus described the invention what is claimed as new and desired to be secured by Letters Patent is:

1. For use with a shackle having an upwardly-facing notch for suspending a bird and a conveyor for advancing the shackle, apparatus for automatically removing the bird from the shackle as the latter is advanced, said apparatus comprising means adapted to be disposed below said conveyor and engageable with the shackle for holding the same against upward movement during advancement; and means adjacent the path of travel of the shackle and engageable with the bird for deflecting the same upwardly out of the notch as the shackle is held and advanced.

2. For use with a shackle having an upwardly-facing notch for suspending a bird, apparatus for automatically removing the bird from the shackle as the latter is advanced, said apparatus comprising means including a pair of spaced devices for gripping the shackle therebetween during advancement for holding the same against upward movement; and means adjacent the path of travel of the shackle and engageable with the bird for deflecting the same upwardly out of the notch as the shackle is held and advanced.

3. For use with a shackle having an upwardly-facing notch for suspending a bird, apparatus for automatically removing the bird from the shackle as the latter is advanced, said apparatus comprising a pair of continuous belts having juxtaposed inner stretches traveling in the same direction and at the same speed as the shackle, said stretches being disposed to grip the shackle therebetween during advancement for holding the same against upward movement; and means adjacent the path of travel of the shackle and engageable with the bird for deflecting the same upwardly out of the notch as the shackle is held and advanced.

4. For use with a shackle having an upwardly-facing notch for suspending a bird and a conveyor for advancing the shackle, apparatus for automatically removing the bird from the shackle as the latter is advanced, said apparatus comprising means adapted to be disposed below said conveyor and engageable with the shackle for holding the same against upward movement during advancement; and an inclined, stationary ramp disposed alongside the path of travel of the shackle, and engageable with the bird as the shackle is held and advanced, for deflecting the bird upwardly out of the notch.

5. For use with a shackle having an upwardly-facing notch for suspending a bird, apparatus for automatically removing the bird from the shackle as the latter is advanced, said apparatus comprising means including a pair of spaced devices for gripping the shackle therebetween during advancement for holding the same against upward movement; and an inclined, stationary ramp disposed beneath said devices and alongside the path of travel of the shackle, and engageable with the bird as the shackle is held and advanced, for deflecting the bird upwardly out of the notch.

6. For use with a shackle having an upwardly-facing notch for suspending a bird, apparatus for automatically removing the bird from the shackle as the latter is advanced, said apparatus comprising a pair of continuous belts having juxtaposed inner stretches traveling in the same direction and at the same speed as the shackle, said stretches being disposed to grip the shackle therebetween during advancement for holding the same against upward movement; and an inclined, stationary ramp disposed beneath said belts and alongside the path of travel of the shackle, and engageable with the bird as the shackle is held and advanced, for deflecting the bird upwardly out of the notch.

7. An automatic bird take-off machine for removing birds hanging from the bird-holding portion of poultry shackles, said machine comprising a pair of continuous belts having juxtaposed inner stretches traveling in the same direction and at the same speed, said stretches being in opposed relationship for gripping the shackles therebetween; and a lifter adjacent the path of travel of the shackle and disposed for engagement with the birds as the shackles advance with said stretches for raising the birds sufficiently to clear said holding portion of the shackles.

8. The invention of claim 7, the holding portion of the shackles being at the lower extremities thereof, the inner stretches being disposed to grip the shackles above the holding portion thereof and above the bird hanging therefrom.

9. The invention of claim 8, said stretches being supported horizontally above the lifter and disposed to guide the shackles along one side of the lifter and the birds along the opposite side thereof.

10. The invention of claim 9, the lifter comprising an elongated, stationary plate normally disposed in a substantially vertical plane and having a longitudinal, uppermost edge sloping upwardly in the direction of travel of the shackles and birds.

11. An automatic bird take-off machine for removing birds hanging from the bird-holding portion of poultry shackles, wherein the shackles are in turn suspended from an overhead conveyor, said machine comprising a lifter adjacent the path of travel of the shackle and including an elongated stationary plate normally disposed in a substantially vertical plane and having a longitudinal, uppermost edge sloping upwardly in the direction of travel of the shackles and birds; and structure between the conveyor and the lifter for guiding the shackles along one side of the lifter and the birds along the opposite side thereof.

12. The invention of claim 11, wherein said structure is provided with means adapted to be disposed below said conveyor and engageable with the shackles to hold the same against upward movement as the birds slide along said edge of the plate.

13. An automatic bird take-off machine for removing birds hanging from the bird-holding portion of poultry shackles, wherein the shackles are in turn suspended from and advanced continuously by an overhead conveyor having a prime mover, said machine comprising a pair of belts beneath the conveyor having juxtaposed, horizontal inner stretches disposed to receive the shackles and grip the shackles therebetween to hold the same against upward movement; power means coupled with the belts for driving the stretches in the same direction and at the same speed as the shackles; and a pair of horizontally-spaced, elongated, stationary plates normally disposed in substantially vertical planes beneath the stretches and disposed in a position to receive the shackles therebetween, each plate having a longitudinal, uppermost edge sloping upwardly in the direction of travel of the shackles and birds for raising the birds sufficiently to clear said holding portion of the shackles.

14. The invention of claim 13, and control means for de-energizing said power means and said prime mover in the event of a change in the relative speeds of the conveyor and the belts, said control means having an actuator disposed for engagement by one of the stretches on movement of the latter out of horizontal.

15. For use with a shackle having an upwardly-facing notch for suspending a bird, apparatus for automatically removing the bird from the shackle as the latter is advanced, said apparatus comprising a pair of continuous belts having juxtaposed inner stretches traveling in the same direction and at the same speed as the shackle, said stretches being disposed to grip the shackle therebetween during advancement for holding the same against upward movement; means adjacent the path of travel of the shackle and engageable with the bird for deflecting the same upwardly out of the notch as the shackle is held and advanced; a conveyor parallel with said stretches and suspending the shackle; prime movers for the conveyor and for the belts respectively; and control means for de-energizing at least one of said prime movers in the event of a change in the relative speeds of the conveyor and the belts, said control means having an actuator disposed for engagement by one of said stretches on deflection of the latter out of parallelism with the conveyor.

16. An unloading device for chicken shackles comprising, a conveyor on which a chicken-carrying shackle is transported, the shackle being adapted to suspend a chicken by parts of the chicken extending through engaging elements in the shackle, an ejecting device having spaced, stationary elements between which the shackle is carried by the conveyor, said elements having cam surfaces engaging against the parts of the chicken which extend through the shackle and elevating the chicken so that such parts are disengaged from the shackle, and the chicken completely separated from the shackle.

References Cited in the file of this patent

UNITED STATES PATENTS

| | | |
|---|---|---|
| 1,760,392 | Arminger | May 27, 1930 |
| 2,345,415 | Nagy | Mar. 28, 1944 |
| 2,811,163 | Weber et al. | Oct. 29, 1957 |
| 2,846,717 | Patterson et al. | Aug. 12, 1958 |
| 2,852,805 | Corey et al. | Sept. 23, 1958 |
| 2,932,382 | James | Apr. 12, 1960 |